P. J. STEENBJERG.
TEMPERATURE INDICATOR.
APPLICATION FILED JUNE 6, 1913.
1,272,554.
Patented July 16, 1918.
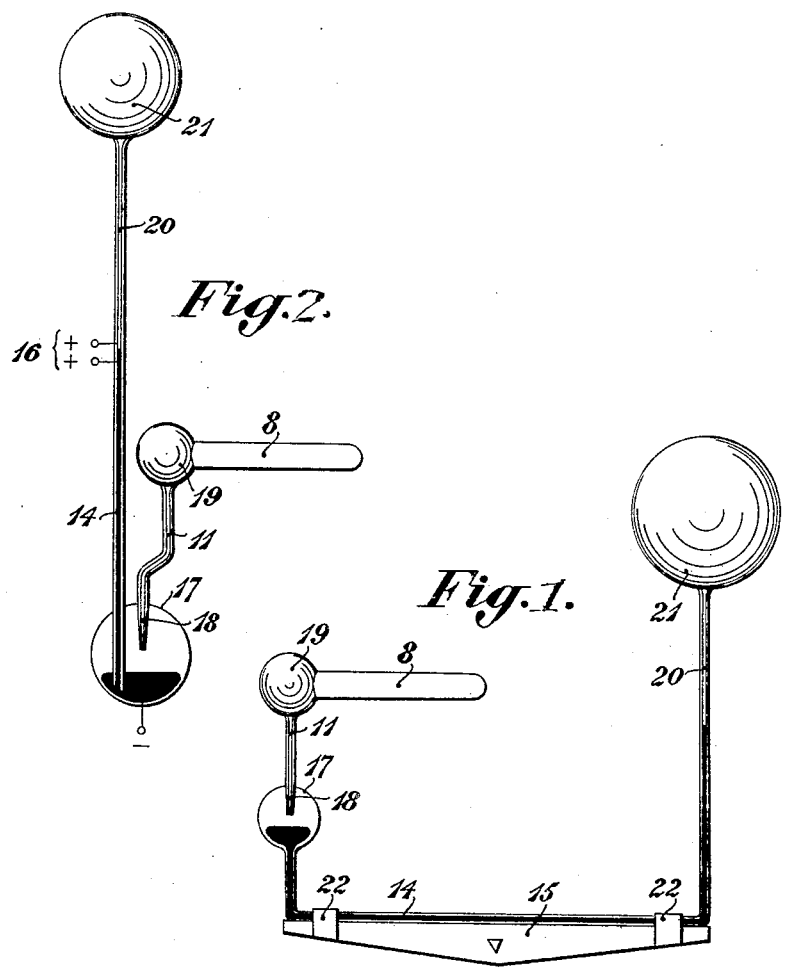

UNITED STATES PATENT OFFICE.

PEDER JÖRGENSEN STEENBJERG, OF FREDERIKSBERG, NEAR COPENHAGEN, DENMARK.

TEMPERATURE-INDICATOR.

1,272,554.   Specification of Letters Patent.   Patented July 16, 1918.

Application filed June 6, 1913. Serial No. 772,100.

*To all whom it may concern:*

Be it known that I, PEDER JÖRGENSEN STEENBJERG, of No. 6 Fuglevangsvej, Frederiksberg, near Copenhagen, in the Kingdom of Denmark, have invented certain new and useful Improvements in or Relating to Temperature-Indicators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

As it is well known, various liquids when near their boiling point are very sensitive to any further supply of heat, as near the boiling point, large fluctuations in the pressure of vapors correspond to fluctuations of heat. The working of thermometers, heat regulators and other apparatus which use such liquids as the operative medium, is however very unreliable, partly because unsaturated steam is formed and partly because saturated steam is again condensed.

According to this invention, in place of a liquid giving off vapors and capable of being itself evaporated, a material is used as a pressure producing medium for the above mentioned purposes, consisting of a substance which in itself is the least capable of evaporating, but on being heated, gives off a gas in large quantities corresponding exactly to the temperature at the moment, the said gas behaving above its critical temperature like a saturated steam which cannot be condensed at the temperatures and pressures in question, that is to say, remains in these conditions a real gas. The pressure produced corresponds in such cases exactly to the temperature at the time. By regulating the counter-pressure, the reaction temperature of a device using such materials can be adjusted as desired.

The materials in question represent therefore chemical combinations which are gradually decomposed by heating into a non-evaporating material and gas which ingredients combine again on the temperature being reduced. As an example of materials that can be used, may be mentioned compounds of ammonia gas with metallic halogen salts, hybrids, bicarbonates, etc. It is not however essential that the non-gaseous ingredient which forms an absorbing means for the gas should be a solid body. The said ingredient may be also a liquid (for instance a molten metal). At the temperature and pressures in question, it must not be however capable of being evaporated, that is to say, it must not have any vapor pressure of its own. The substance of the invention will become clear by comparing for instance the compound of silver chlorid with ammonia gas and an aqueous solution of ammonia gas. In the latter, in addition to the pressure of ammonia gas, that of superheated easily condensing steam soon becomes noticeable, while in the silver chlorid ammonia, the ammonia gas released as the heating increases, represents the only pressure producer.

In the accompanying drawings—

Figure 1 is an elevation of one form of device embodying my invention, and

Fig. 2 is an elevation of a modified form.

In the devices shown, the fluctuations of temperature or the fluctuations of pressure of the regulating material inclosed in the receiver 8, exactly corresponding to the said changes of temperature, move a liquid mass or a liquid thread 14, for instance of mercury, and in that way in the construction shown in Fig. 1, the lever or beam 15 is turned, or an electric contact 16 (maximum and minimum contact) is closed, and then the said movement or the electric current transmit their influence in any desired manner to the well known control or indicator devices (not shown).

When mercury is used for the purpose of changing the center of gravity, closing contacts or the like, and on the other hand chlorid of silver is used as a vehicle for the ammonia gas, care must be taken to prevent mercury from passing into receptacle 8 containing the silver salt, so that the silver salt may not be decomposed. To that end, in front of the tank 8 is arranged a bulb 17 of such size that the whole quantity of mercury contained in the said apparatus, does not fill the said bulb even to one-half. The pipe 11 leading to the tank 8, opens with a fine point 18 into the ball 17, so that mercury never enters the pipe 11. If owing to vibrations, in case of an apparatus arranged horizontally or turned over, a drop of mercury should get into the pipe 11, 18 it would be stopped in a second bulb 19 arranged in front of the tank 8, in order to return to the ball 17 when the apparatus is again in the normal position. The pipe 11 can be formed into a distant pressure transmitting pipe.

The heating pipe 20 connected to the ball 17 (pressure chamber) is on the other hand connected to a closed chamber (for instance a ball 21) of such capacity that in the movements in question of the liquid thread, the pressure of the gas inclosed in the said chamber is scarcely altered. The whole apparatus is in that way completely closed, and the absorbed or pressure producing gas is generated at a constant counter pressure (if desired at a vacuum). The pressure producing gas and the gas inclosed in the tank 21 are preferably the same. Owing to the fact that when the apparatus is placed horizontally or turned over, more or less gas passes from the pressure side of the apparatus (the tank 8) to the counter-pressure side (tank 21), the reaction temperature of the apparatus can be regulated as desired.

The reaction temperature can be also modified by selecting for the working position of the apparatus a more or less oblique position. To that end, the apparatus shown in Fig. 1, is arranged on the beam 15 in a rotatable manner by means of holders 22. The apparatus could also be rotated about an axis at a right angle to the plane of oscillations of the beam.

I claim:

In a temperature indicating device, a receptacle, chlorid of silver therein having chemically united therewith ammonia gas capable of being liberated by heat and chemically reunited upon cooling, said liberation and absorption being a function of the temperature, a container, a body of mercury therein actuated by said gas, a chamber into which said mercury may be moved and containing a volume of like gas counteracting on said mercury, and means operated by the movement of said mercury.

In testimony that I claim the foregoing as my invention, I have signed my name in presence of two subscribing witnesses.

PEDER JÖRGENSEN STEENBJERG.

Witnesses:
ERNEST BOUTARD,
EMIL MOURITZEN.

Copies of this patent may be obtained for five cents each, by addressing the "Commissioner of Patents, Washington, D. C."